United States Patent [19]

Tomioka et al.

[11] Patent Number: 4,655,327
[45] Date of Patent: Apr. 7, 1987

[54] IMPELLER TYPE DESCENT SLOWING DEVICE

[75] Inventors: Hisatsugu Tomioka; Tazuo Waki; Hiroyuki Sugaya, all of Tokyo, Japan

[73] Assignee: Lonseal Corporation, Tokyo, Japan

[21] Appl. No.: 666,764

[22] Filed: Oct. 31, 1984

[30] Foreign Application Priority Data

Mar. 15, 1984 [JP] Japan ................... 59-50227

[51] Int. Cl.$^4$ .................. F16D 57/00; A62B 1/12; B66D 3/04
[52] U.S. Cl. .................... 188/290; 182/233; 188/180; 254/391
[58] Field of Search .............. 188/65.1, 65.2, 188, 188/290, 293, 296, 180; 182/71, 72, 192, 233, 238, 241; 192/3.21, 3.22, 3.31, 3.34, 58 A; 254/277, 356, 391, 392, 344; 474/175, 185; 187/74, 89

[56] References Cited

U.S. PATENT DOCUMENTS 2,534,679 12/1950 Place ........................... 474/175 X
2,875,981 3/1959 Hunter ......................... 474/175 X

FOREIGN PATENT DOCUMENTS 0120837 9/1900 Fed. Rep. of Germany ........ 182/71
15-3520 2/1940 Japan .
51-96200 8/1976 Japan .
51-110398 9/1976 Japan .
52-20483 6/1977 Japan .
55-103871 8/1980 Japan .
56-37836 9/1981 Japan .
0140464 5/1953 Sweden .................... 254/391

Primary Examiner—Andres Kashnikow
Assistant Examiner—Robert J. Oberleitner
Attorney, Agent, or Firm—Sandler & Greenblum

[57] ABSTRACT

A descent slowing device is disclosed that includes a housing having an input driving shaft and a driving pulley fitted thereon and accommodating therein a gear train and an impeller adapted to be driven through the gear train by a driving pulley about which is trained a rope or line. When one end of the line descends owing to a load acting thereon to rotatively drive the driving pulley and hence the impeller, the rotation of the impeller is restrained by rotation control oil or similar viscous fluid in which the impeller is immersed, thereby controlling the descent of the load at a constant slow speed. According to the invention, the impeller comprises four blades, the rotating speed ratio of the impeller to the input driving shaft being more than 40:1. Moreover, the driving pulley is formed with a rope receiving groove comprising line abutting projections and non-contact recesses alternately arranged. There are provided a stationary pulley and pendulum pulleys, the line passing between the pendulum pulleys, respectively, and the stationary pulley to cause a frictional compression of the rope between one of the pendulum pulleys and the stationary pulley. Descent is thus controlled if the load is very large, and line slippage is avoided. With the above arrangement, the device according to the invention operates smoothly and securely even after long unused periods of time, under continuous load conditions, and at high or low temperature conditions.

16 Claims, 8 Drawing Figures

IMPELLER TYPE DESCENT SLOWING DEVICE

BACKGROUND OF THE INVENTION

1. Field of the Invention

This invention relates to an impeller type descent slowing device including a closed housing, a gear train, an impeller and rotation control oil or similar viscous fluid housed in the closed housing, and an input driving shaft fitted with a driving pulley about which is trained a rope or line so that upon application of a load on the line, the impeller is rotated by means of the input driving shaft in the gear train in a manner such that rotation of the impeller is restrained by the rotation control oil or similar viscous fluid to obtain a constant descent speed for the load.

2. Description of the Prior Art

Various kinds of impeller type descent slowing devices, each having a housing accommodating a gear train and an impeller immersed in rotation control oil so as to restrain rotation of the impeller by viscous action of the oil to cause a load to lower slowly, have been suggested in Japanese Examined Patent Publication (Kokoku) Nos. 52-20,483 and 56-37,836 and a Japanese Unexamined Patent Publication (Kokai) No. 55-103,871. Publication Nos. 52-20,483 and 56-37,836 disclose rotation control oils themselves and describe that such oils are used for reduction devices in which the oils are stirred by a number of gears. Details of the impeller are not necessarily made clear in these publications, however.

Japanese Unexamined Patent Publication No. 55-103,871 discloses a mechanism somewhat similar to that of the present invention, which comprises an input driving shaft, an impeller, rotation control oil, and pendulum pulleys; but this unexamined Publication does not clarify the following aspects: (1) the optimum rotating ratio between the impeller and the input driving shaft; (2) volumetric capacities of a housing and gears, with an impeller and metal support assumed to be contained in the housing; (3) the shape and area of blades; and (4) the use of an auxiliary mechanism for ensuring slow descent irrespective of existing temperature and load differentials.

Regarding aspect (1), the rotating ratio is governed by the necessary descent speed of a load (for example, a person), the mechanism working through means of a line extending around a driving pulley fitted on an input driving shaft; with rotation control oil in a housing, rotating force transmitted from the input driving shaft is transmitted to the impeller that in turn rotates. Highly viscous rotation control oil provides resistance to rotation to ensure a safe descent speed. In other cases, such as the descent of dry goods or the like, it is not necessary that the rotation be particularly slow. In order to obtain a slow descent speed within a certain range and to avoid excess acceleration and deceleration, an optimum rotating ratio is therefore required.

Regarding aspect (2), the optimum capacities of the housing and components therein must be determined in order to apply it to practical use and to prevent extraordinary temperature rise of the rotation control oil.

Regarding aspect (3), two, three, and four blade impellers are considered useful configurations. It is important to determine the most preferable shape of the impeller and the optimum blade area associated with kinds of rotation control oil.

Regarding aspect (4), the temperature and load are important factors in practical use. Rotation control oil whose viscosity does not vary with changes in temperature is ideal for this use, but such an oil does not exist. An auxiliary mechanism therefore is necessary to prevent increases and decreases in descent speed due to viscosity changes governed by temperatures changes and for preventing speed changes linked to load changes. Japanese Unexamined Patent Publication No. 55-103,871 does not consider these factors, and therefore its structure results in great difficulties during practical use.

SUMMARY OF THE INVENTION

Accordingly, it is a general object of the present invention to provide an improved impeller type descent slowing device that eliminates all of the difficulties in the prior art by disclosing all of the factors required to construct and operate a device of this kind.

The impeller type descent slowing device of the present invention comprises: (a) a closed housing having a predetermined inner volume; (b) a plurality of gears positioned within the housing; (c) an impeller positioned within the housing; (d) a viscous fluid within the housing comprising means for controlling rotation of the impeller; (e) an input drive shaft positioned within the housing and a drive shaft pulley fitted about the drive shaft; (f) a line trained about the drive pulley, the impeller comprising four blades, the ratio of the speed of rotation of the impeller, with respect to the speed of rotation of the input driving shaft being greater than 40:1, the rotation control oil comprising means for restraining rotation of the impeller to obtain a constant speed of descent for a load when the load is applied to the line, the impeller being rotated through the input drive shaft.

The rotation control fluid occupies between 90% and 96% of the volume defined by the housing and unoccupied by the gears, the impeller, and a metal bracket that comprises a support for the drive shaft. The volume can be filled between 94% and 96% of the unoccupied space within the housing.

The drive pulley has a plurality of projections that abut and contact the line when the line is positioned on the drive pulley, and a plurality of non-contact recesses positioned between adjacent projections. Alternately abutting projections and recesses are arranged in the form of a substantially regular polygon, as viewed in cross-section.

The device further comprises a stationary pulley and two pendulum pulleys, the pendulum pulleys being rockable in unison, with the line extending between respective pendulum pulleys and the stationary pulley, with the pendulum pulley and the stationary pulley together comprising means for frictionally compressing the line. The pendulum pulleys are rotatably mounted at the ends of bases of triangular plates having apexes that are pivotably mounted on the housing, with triangular plates formed with elongated slots that are adapted to receive the stationary pulley and limit movement of the pendulum plate and comprising means for permitting the pendulum pulleys to move toward and away from the stationary pulley.

The device further comprises a pendulum pin for pivotably mounting said pendulum pulley with respect to the stationary pulley, the pendulum pin being positioned substantially at the mid-point between the center of the input drive shaft and the stationary pulley, along an imaginary straight line that would connect the centers.

The driving pulley is positioned on an exterior side of the housing. The stationary pulley and two pendulum pulleys are attached to the exterior of the housing on the same side as the driving pulley. The housing has an upper edge and a lower edge, with the driving pulley positioned adjacent the upper edge of the housing and the stationary pulley and the pendulum pulleys positioned adjacent the lower edge of the housing. These pendulum pulleys are positioned to either side, and slightly above, the stationary pulley. This plurality of pulleys comprises three gears, one of the gears being driven by the input driving shaft, the other two gears being free to rotate. The impeller comprises a toothed pinion engageable with one of the two freely rotatable gears and driven by the third gear.

The invention may be more clearly understood and preferred embodiments described, by way of example, with reference to the accompanying drawings.

DETAILED DESCRIPTION OF THE PREFERRED EMBODIMENTS

Figure 3:
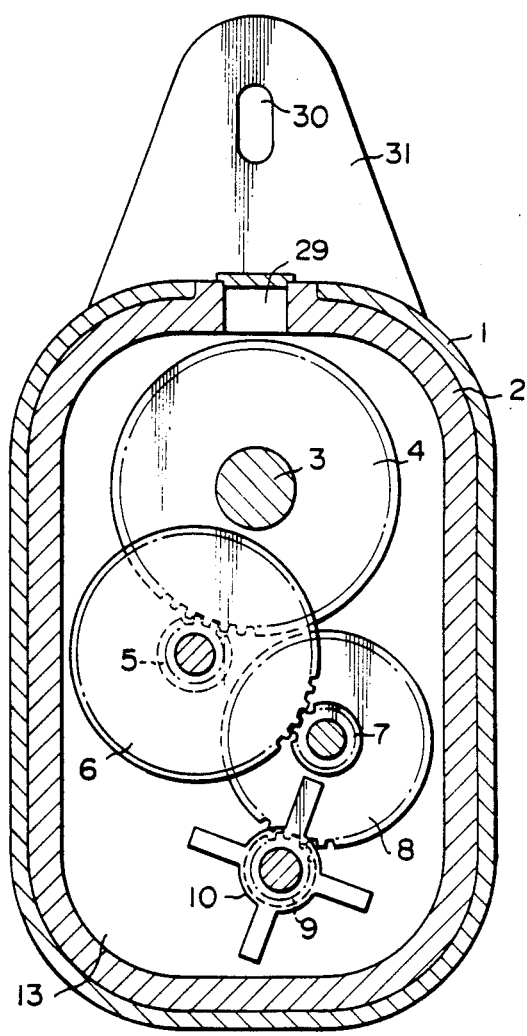
FIG. 3 is a longitudinal sectional view of the device shown in FIG. 1.

One embodiment of a descent slowing device in accordance with the present invention shown in FIG. 3 comprises a housing consisting of a casing 1 and a cover 2 for accommodating a plurality of gears forming a gear train and an impeller. Only the input driving shaft 3 extends out of casing 1. A gear 4 is fixed to the input driving shaft 3 and meshes with a pinion 5, thereby rotating a second gear 6 having a shaft common to pinion 5. The second gear 6 engages a second pinion 7 to rotate a third gear 8 having a shaft common to second pinion 7. The third gear 8 engages a third pinion 9 to rotate impeller 10 having a shaft common to third pinion 9.

Figure 2:
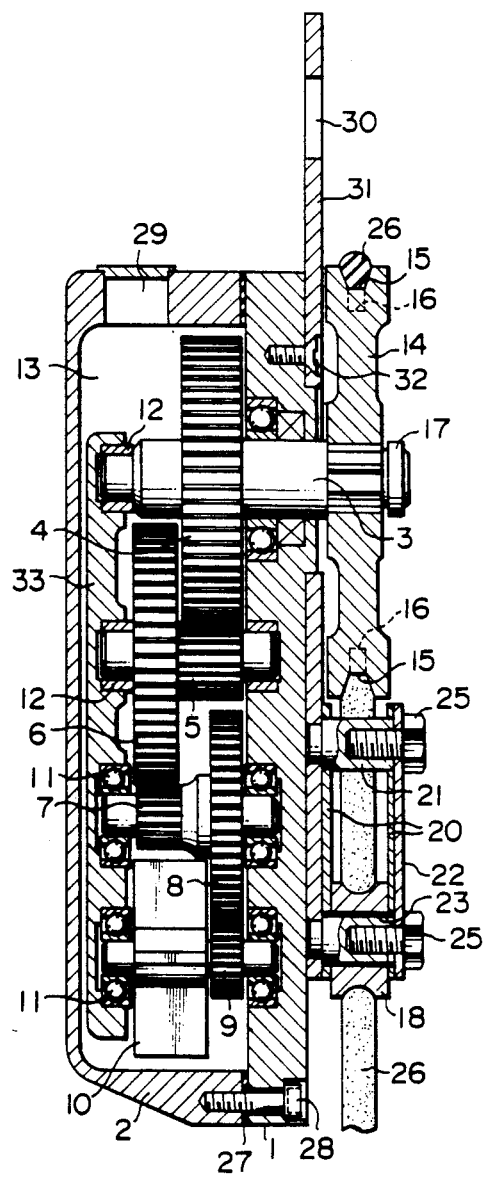
FIG. 2 is a sectional view taken along an axis II—II in FIG. 1.

These gears and the impeller are journalled by bearings such as ball bearings 11, oilless metal sleeves 12 and other materials, as shown in FIG. 2, all supported by metal bracket 33. These members are contained in a housing formed by casing 1 and cover 2. Referring to FIG. 3, a space 13 is formed in the housing with a free volume exclusive of that occupied by the above-mentioned gears, impeller, bearings, and support. Input driving shaft 3 extends out of the housing with driving pulley 14 fitted and fixed to it.

Driving pulley 14 has a line receiving groove (FIG. 1) comprising line abutting projections 15 and non-contact recesses 16 secured to input driving shaft 3 by means of a bearing nut 17. Stationary pulley 18 is provided on the outside of casing 1 near its lower end in alignment vertically with driving pulley 14. Two pendulum plates 20 of substantially triangular shape are rockably mounted at their apexes on casing 1 by means of a pendulum plate pin 21. Two pendulum pulleys 19 and 19' are mounted at ends of a base of triangular pendulum plate 20 so as to be spaced from stationary pulley 18 on both sides by a distance substantially equal to and slightly larger than the diameter of the rope extending around driving pulley 14. Side plate 22 is provided between pendulum plate 20 and stationary pulley 18 so as to restrain pendulum plates 20 to prevent misalignment. Moreover, pendulum plates 20 are formed with elongated slots 24 for stationary shaft 23 of stationary pulley 18 so that pendulum pulleys 19 and 19' can be moved out of vertical alignment from the stationary pulley's position.

Pendulum plate pin 21 and stationary shaft 23 of stationary pulley 18 are fixed to casing 1 by tightening means such as hexagonal headed bolts 25. The fixed position of pendulum plate pin 21 is located substantially at the mid-point of a straight line connecting input driving shaft 3 and stationary pulley 18 or at a mid-point located between the centers of shaft 3 and pulley 18, as viewed in FIG. 1.

Suspension line 26 is trained about driving pulley 14 within the suspension groove and passes between pendulum pulleys 19 and 19', respectively, and the stationary pulley 18. Ends of the suspension line are tensioned.

Casing 1 and cover 2 are fixed together by set bolts 28 with packing 27 located therebetween. Rotation control oil fills space 13 and is introduced through aperture 29 in the housing.

The descent slowing device constructed as described above is provided with hanging member 31 having a hanging aperture 30 secured thereto by means of set screws 32. The device can thus be hung where required.

A very important feature of this design is the reduction ratio between gear 4 of input driving shaft 3 and third pinion 9 of the impeller.

Table 1 shows speed ratios of a reference example of the prior art and first and second embodiments of the present invention. The gear train of this example was designed based upon an arrangement illustrated in FIG. 1 of Unexamined Japanese Publication (Kokai) No. 55-103,871.

TABLE 1

| Reference example | First embodiment of the invention | Second embodiment of the invention |
| --- | --- | --- |

TABLE 1-continued

Mechanism of gear

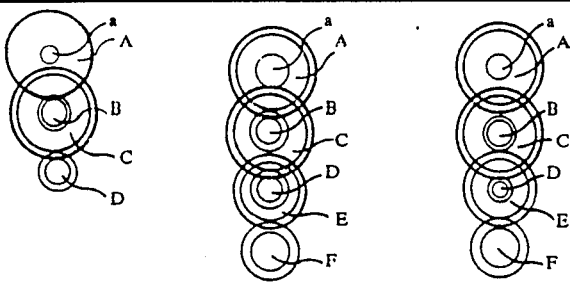

| Reduction ratio | | 30.2:1 | | | | 41:1 | | | | 47.2:1 | | |
|---|---|---|---|---|---|---|---|---|---|---|---|---|
| Constitution | Gear | z | m | d | Gear | z | m | d | Gear | z | m | d |
| | A | 72 | 0.8 | 59 | A(4) | 70 | 1 | 70 | A(4) | 35 | 2 | 70 |
| | B | 13 | 0.8 | 12 | B(5) | 14 | 1 | 14 | B(5) | 9 | 2 | 18 |
| | C | 71 | 0.8 | 59 | C(6) | 71 | 1 | 71 | C(6) | 42 | 1.5 | 63 |
| | D | 13 | 0.8 | 12 | D(7) | 13 | 1 | 13 | D(7) | 11 | 1.5 | 16.5 |
| | | | | | E(8) | 36 | 1.25 | 45 | E(8) | 54 | 1 | 54 |
| | | | | | F(9) | 24 | 1.25 | 30 | F(9) | 17 | 1 | 17 |

Remarks
z: Number of teeth of gear
m: Module
d: Pitch diameter of gear
a: Input shaft Table 1 will be explained hereinafter. In the reference example, input drive shaft a is fitted with a drive pulley about which a rope extends. As a load descends, the drive pulley rotates. When input drive shaft a is rotated, a gear A having its shaft common to the input drive shaft is rotated to drive a pinion B enmeshed with gear A. When pinion B rotates, a second gear C is rotated to drive pinion D for an impeller. In this case, a ratio of the number of times that pinion D rotates for the impeller and the first gear A (or the input driving shaft) is obtained by dividing the product of the numbers of teeth of the first and second gears A and C (or 72×71) by a product of the numbers of teeth of the first pinion B and the pinion for the impeller (or 13×13). In the reference example, this value is 30.2:1. In the first and second embodiments of the invention, this value is 41:1 and 47.2:1, which conforms closely with the ratio 40:1. It appears that these values were selected at will, but, however, where a rotation control oil with viscosity is between 100–500 cps at −20° C. is used, the selection of the ratio is critical. Table 2 indicates descent speeds of the reference example and the first and second embodiments of the invention.

TABLE 2

| Rotation Control oil | Load (kg) | Constitution | Descending speed (cm/sec) | | | |
|---|---|---|---|---|---|---|
| | | | −20° C. | 0° C. | 15° C. | 50° C. |
| *1A | 25 | Reference example | 44.4 | 47.0 | 47.5 | 49.7 |
| | | First embodiment | 39.4 | 41.3 | 41.7 | 42.1 |
| | | Second embodiment | 28.5 | 33.3 | 35.1 | 35.5 |
| | 100 | Reference example | 124.3 | 128.3 | 132.8 | 140.2 |
| | | First embodiment | 82.3 | 85.6 | 86.1 | 87.8 |
| | | Second embodiment | 58.8 | 62.4 | 63.3 | 63.8 |
| *2B | 25 | Reference example | 40.7 | 46.4 | 48.2 | 49.6 |
| | | First embodiment | 37.5 | 38.8 | 39.9 | 40.1 |
| | | Second embodiment | 31.2 | 35.7 | 37.0 | 38.0 |
| | 100 | Reference example | 122.1 | 123.0 | 122.6 | 128.3 |
| | | First embodiment | 79.8 | 80.2 | 80.9 | 82.7 |
| | | Second embodiment | 64.3 | 69.9 | 70.8 | 73.8 |
| *3C | 25 | Reference example | 42.3 | 50.5 | 52.1 | 53.2 |
| | | First embodiment | 45.1 | 46.3 | 46.6 | 48.5 |
| | | Second embodiment | 28.1 | 28.4 | 29.5 | 30.3 |
| | 100 | Reference example | 127.9 | 131.1 | 134.3 | 140.2 |
| | | First example | 74.3 | 82.9 | 87.6 | 89.1 |
| | | Second embodiment | 52.9 | 62.8 | 62.9 | 65.4 |

Remarks
*1A: Mineral operating oil −20° C.: 150 cps
*2B: Ester lubricating oil −20° C.: 200 cps
*3C: α-olefin oligomer −20° C.: 350 cps An emergency descent slowing device requiring such features is prescribed in a Japanese ordinance issued by the Japanese Autonomy Agency Ordinance No. 4, a ministerial ordinance for technical standardization of descent slowing devices, established on Jan. 12, 1965, and revised by Ordinance No. 31 on Nov. 1, 1973, in Article 5 prescribes a descent speed of more than 16 cm/sec but less than 150 cm/sec, when subjected to a load of 25 kg, 65 kg, and 100 kg, respectively, at a temperature between −20° C. and +50° C. As can be seen from Table 2, the reference example illustrates descent speeds over 100 cm/sec by all rotation control oils under conditions of 100 kg loading and at a temperature range between −20° C. and 50° C. and, in particular, descent speeds of approximately 140 cm/sec near to the prescribed upper limit of Ordinance No. 4 under conditions of 100 kg loading and at 50° C. temperature. In contrast to this example, the first and second embodiments exhibit descent speeds less than 100 cm/sec. Although the descent speeds of the reference example are within the prescribed range, such descent speeds higher than 100 cm/sec are not suitable because it alarms and may endanger rescue victims. In the event that the ratio of a number of rotations of the pinion for the impeller and the first gear of the input driving shaft is more than 40:1, as in the embodiments of the invention, the descent device describes descent speeds less than 100 cm/sec even under conditions of 100 Kg loads at 50° C., when using a rotation oil having a viscosity of 500 cps at −20° C. It describes descent speeds more than 25 cm/sec even under conditions 25 Kg loads at −25° C. These features are very important for devices in which safety is indispensable. An object of the present invention lies in safety.

The total weight and total volume of a descent slowing device cannot be overlooked in practical use. Inventions or proposals for such devices previously have taken into account these factors. Ideally, these devices should be light in weight and small in volume, which makes them easy to transport and to use. It has been determined, through experimentation, that the present invention cannot be limited to very small and lightweight devices because of the limitations of the above ratio of rotations and the volume requirement of enclosed rotation control oil. It has been found that the inner volume of the devices should be 750–1000 cm³, of which 150–250 cm³ should be occupied by gears, shafts, the impeller, and hanging members for journalling these shafts. In other words, in the closed housing the ratio of the unoccupied or free volume filled with rotation control oil should be 500–800 cm³. The ratio of unoccupied to occupied volume thus should be 500–800:200–250, or substantially 2:1 to 4:1.

In addition to the ratio of spaces or volumes, the filled volume or filling ratio of the rotation control oil also is very important. The filling ratio is a percentage of the rotation control oil volume to the volume unoccupied by gears, shafts for the gears, the impeller, and hanging members for journalling these members in the closed housing. If the filling ratio is 100%, the oil that expands due to temperature rise attributable to gear motion, especially under continuous descent conditions, can result in cracks in casing 1 or cover 2 in the proximity of set screws 28. Oil leakage from the clearance between casing 1 and the input driving shaft is also possible. Experiments have clarified that when the filling ratio of the rotation control oil is less than 90%, air bubbles form in the oil as the gears and impeller are rotated; an extraordinary increase in descent speed than occurs as viscosity of the oil has been lowered. This is indicated in Table 3 and FIG. 5.

TABLE 3

| Test No. | Filling ratio | | | | | | | | | |
|---|---|---|---|---|---|---|---|---|---|---|
| | 100% | | 90% | | 80% | | 70% | | 60% | |
| | Load | | | | | | | | | |
| | 25 kg | 100 kg | 25 kg | 100 kg | 25 kg | 100 kg | 25 kg | 100 kg | 25 kg | 100 kg |
| 1 | 37.5 | 78.1 | 40.8 | 83.0 | 66.1 | 114.2 | 104.2 | 125.3 | 130.4 | 178.1 |
| 2 | 37.1 | 78.5 | 43.0 | 85.0 | 70.1 | 106.4 | 99.3 | 123.7 | 122.0 | 165.6 |
| 3 | 37.7 | 78.1 | 41.5 | 83.0 | 66.4 | 107.6 | 102.7 | 125.0 | 123.0 | 182.0 |
| 4 | 37.1 | 78.1 | 43.3 | 82.4 | 61.5 | 100.4 | 98.0 | 126.1 | 116.3 | 169.5 |
| 5 | 38.9 | 78.1 | 43.6 | 83.7 | 68.2 | 102.7 | 103.4 | 126.2 | 120.0 | 181.0 |
| 6 | 36.1 | 77.7 | 43.9 | 83.7 | 64.9 | 98.2 | 101.0 | 123.9 | 118.1 | 175.4 |
| 7 | 37.6 | 78.1 | 43.0 | 84.3 | 69.1 | 102.7 | 98.3 | 123.9 | 120.0 | 182.0 |
| 8 | 36.5 | 78.1 | 44.5 | 80.5 | 64.4 | 95.0 | 97.8 | 125.3 | 121.0 | 179.0 |
| 9 | 37.7 | 75.8 | 44.4 | 83.0 | 69.1 | 98.2 | 100.2 | 124.5 | 123.0 | 182.0 |
| 10 | 36.9 | 78.5 | 44.1 | 82.4 | 65.2 | 95.0 | 101.3 | 125.2 | 120.0 | 180.0 |
| Average value | 37.3 | 77.9 | 43.2 | 83.1 | 66.5 | 102.0 | 100.6 | 124.9 | 121.4 | 177.5 |

This phenomenon is due to insufficient amount of rotation control oil. Therefore, the optimum amount of oil between 90 and 100% is very important in view of the safety requirements and assurance that constant slow descent speed will be available through repeated use. Experimentation determined that the optimum fill ratio lay between 90 to 96%, although the ratio was somewhat different depending upon the kind of oil used. This is illustrated in Table 4 and FIG. 6.

Figure 6:
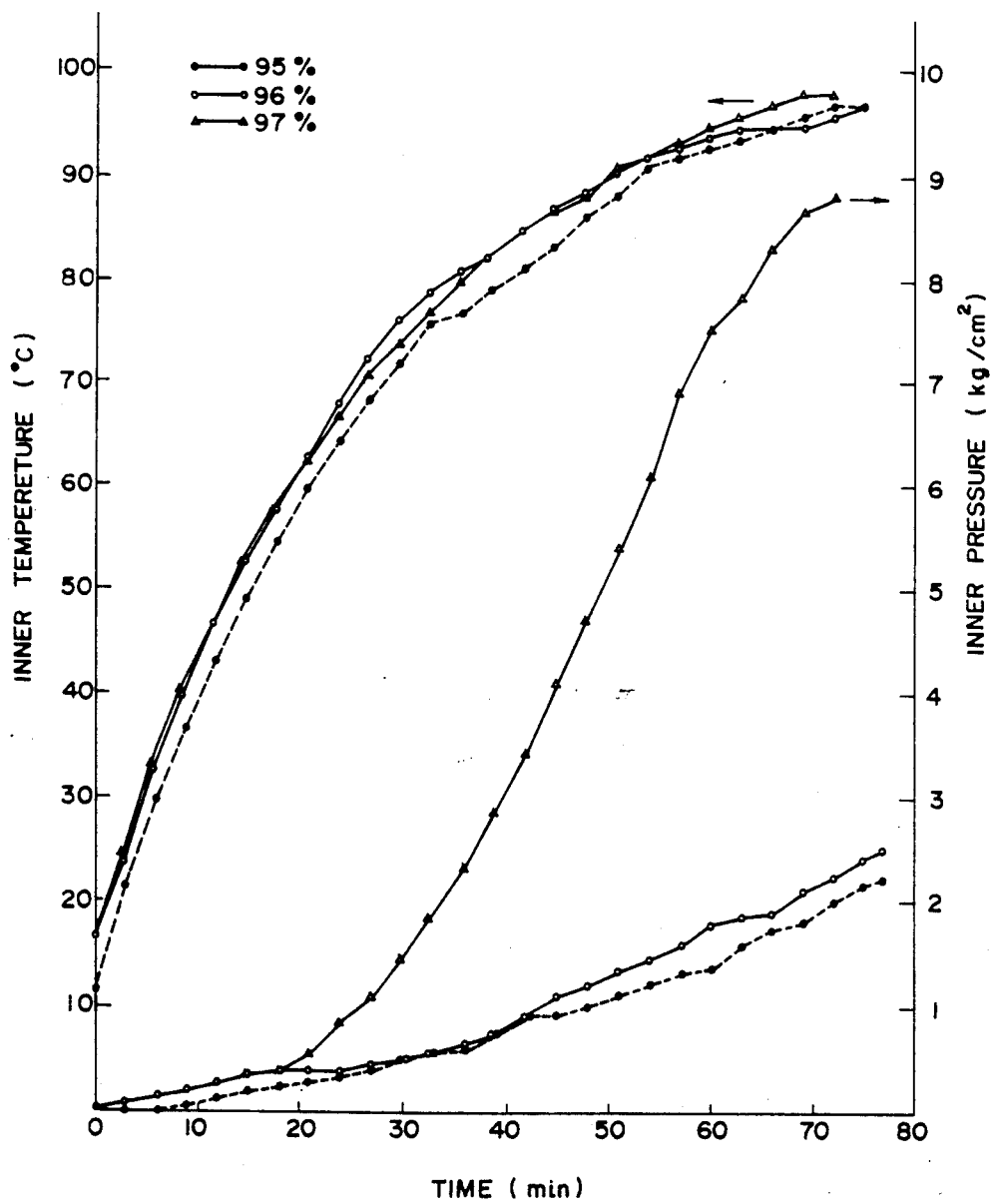
FIG. 6 is a graph illustrating the relationship between the temperature and inner pressure of the housing and the filling ratio of rotation control oil.

In FIG. 6, the right ordinate indicates inner pressure in the housing of the device. The left ordinate shows temperature of the housing of the device. As can be seen from FIG. 6, there is no difference in inner pressure between filling ratios of 95 and 96%, but the filling ratio of 97% considerably increases the inner pressure.

TABLE 4 *1

| | Condition | | | | | |
|---|---|---|---|---|---|---|
| | 95% *2 | | 96% *2 | | 97% *2 | |
| Time (min) | Temperature of housing (°C.) | Inner pressure (kg/cm²) | Temperature of housing (°C.) | Inner pressure (kg/cm²) | Temperature of housing (°C.) | Inner pressure (kg/cm²) |
| 0 | 11.5 | 0 | 16.0 | 0 | 16.5 | 0 |
| 3 | 21.5 | 0 | 23.5 | 0.1 | 24.5 | 0.1 |
| 6 | 29.5 | 0 | 32.5 | 0.15 | 33.0 | 0.15 |
| 9 | 36.5 | 0.05 | 39.5 | 0.2 | 40.5 | 0.2 |
| 12 | 43.0 | 0.15 | 46.5 | 0.3 | 46.5 | 0.3 |
| 15 | 49.0 | 0.2 | 52.5 | 0.35 | 52.5 | 0.35 |
| 18 | 54.5 | 0.25 | 57.5 | 0.4 | 57.5 | 0.40 |
| 21 | 59.5 | 0.3 | 62.5 | 0.4 | 62.0 | 0.55 |
| 24 | 64.5 | 0.35 | 67.5 | 0.4 | 66.5 | 0.85 |
| 27 | 68.0 | 0.4 | 72.0 | 0.45 | 70.5 | 1.1 |
| 30 | 71.5 | 0.5 | 75.5 | 0.5 | 73.5 | 1.45 |

TABLE 4 *1-continued

| Time (min) | Condition | | | | | |
|---|---|---|---|---|---|---|
| | 95% *2 | | 96% *2 | | 97% *2 | |
| | Temperature of housing (°C.) | Inner pressure (kg/cm²) | Temperature of housing (°C.) | Inner pressure (kg/cm²) | Temperature of housing (°C.) | Inner pressure (kg/cm²) |
| 33 | 75.5 | 0.55 | 78.5 | 0.55 | 76.5 | 1.85 |
| 36 | 76.5 | 0.6 | 80.5 | 0.65 | 79.5 | 2.3 |
| 39 | 79.0 | 0.75 | 82.0 | 0.75 | 82.0 | 2.85 |
| 42 | 81.0 | 0.9 | 84.5 | 0.9 | 84.5 | 3.4 |
| 45 | 83.0 | 0.9 | 86.5 | 1.1 | 86.5 | 4.1 |
| 48 | 86.0 | 1.0 | 88.0 | 1.2 | 88.5 | 4.7 |
| 51 | 88.0 | 1.1 | 90.0 | 1.35 | 90.5 | 5.4 |
| 54 | 90.5 | 1.2 | 91.5 | 1.45 | 91.5 | 6.1 |
| 57 | 91.5 | 1.3 | 92.5 | 1.6 | 93.0 | 6.9 |
| 60 | 92.5 | 1.35 | 93.5 | 1.8 | 94.5 | 7.5 |
| 63 | 93.5 | 1.6 | 94.0 | 1.85 | 95.5 | 7.85 |
| 66 | 94.5 | 1.75 | 94.5 | 1.9 | 96.5 | 8.3 |
| 69 | 95.5 | 1.8 | 94.5 | 2.1 | 97.5 | 8.65 |
| 72 | 96.5 | 2.0 | 95.5 | 2.25 | 97.5 | 8.8 |
| 75 | 96.5 | 2.15 | 96.5 | 2.4 | — | — |
| 77 | — | 2.2 | — | 2.5 | — | — |

NOTES:
*1 The input driving shaft was driven rotatively at 103 rpm (equivalent to descending speed 60 cm/sec.) for 24.5 seconds and stopped for 20 seconds. Thereafter, the input drive shaft was driven in the reverse direction at 103 rpm for 24.5 seconds. In this manner, the shaft was continuously rotatively driven, during which time the temperature and pressure were measured every 3 minutes.
*2 The rotation control oil was alpha-olefin oligomer.

In the experiments of Table 4, an alpha-olefin oligomer was used as the rotation control oil. The trends illustrated in this table holds true with minerals oils and ester oils such as TCP-DOS. Accordingly, the optimum filling ratio determined was 90 to 96%, preferably 94 to 96%.

A further important function is the construction of the impeller according to the present invention. The function of the impeller is to eliminate or absorb the energy transmitted through the input drive shaft derived from the descent of a load by restraining force of the rotation control oil against the rotation of the impeller, thereby controlling the descent speed of the load to be within a constant range. It therefore is required to design an impeller of high efficiency to conserve size. In general, impellers having 2, 3 or 4 blades were considered. It was found that the wider the total area of blades during one revolution, the larger was the descent control effect (the best being 4 blades, which are better than 3 blades, which are in turn better than 2 blades). When the total blade areas of impellers are equal, the impeller having a wider area per blade was better. In considering accidental breakage of the blade in strains caused by repeated resistances to rotation of blades, it was considered imprudent to select the number of blades only on the basis of the above discovery when the device was used in the safety situations. A four blade impeller was the best choice as a result.

Figure 7:
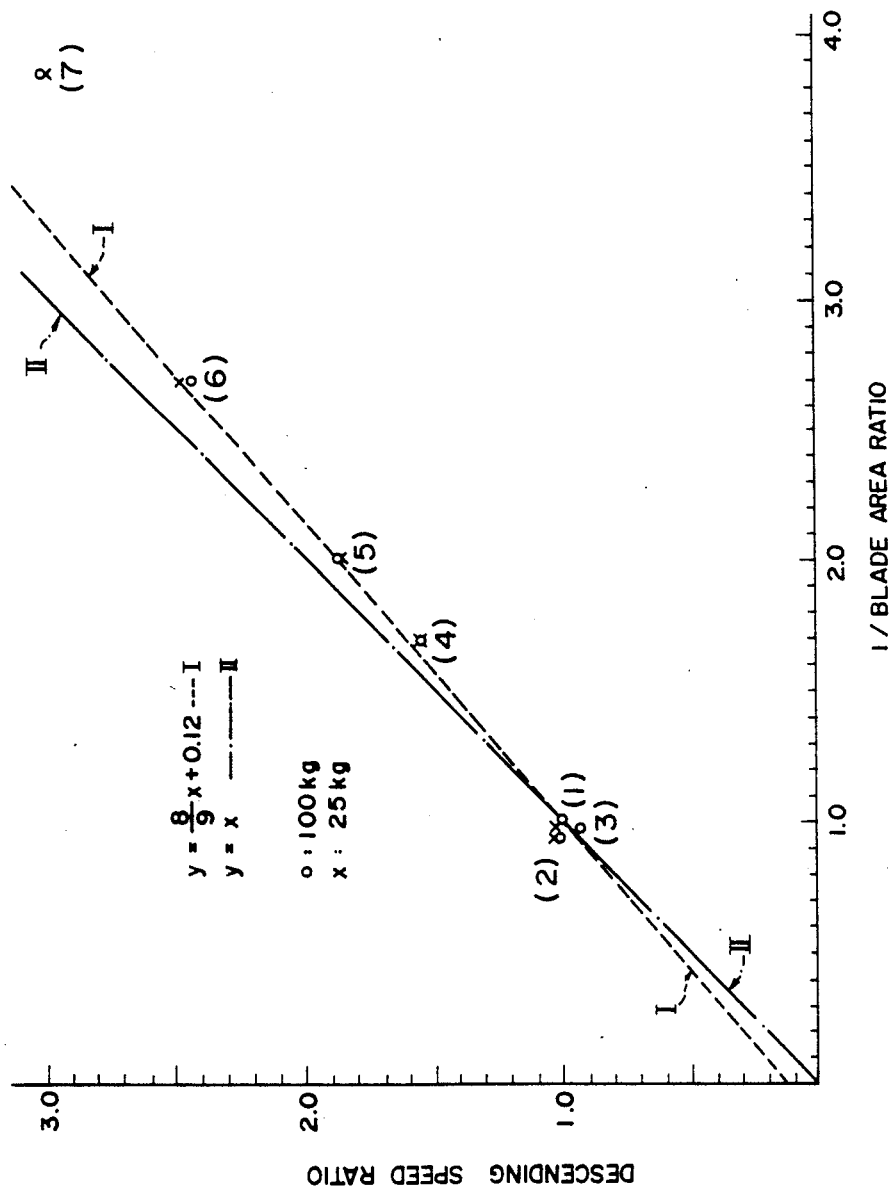
FIG. 7 is a graph showing the relationship between the blade area ratio and the descent speed ratio.
Figure 8:
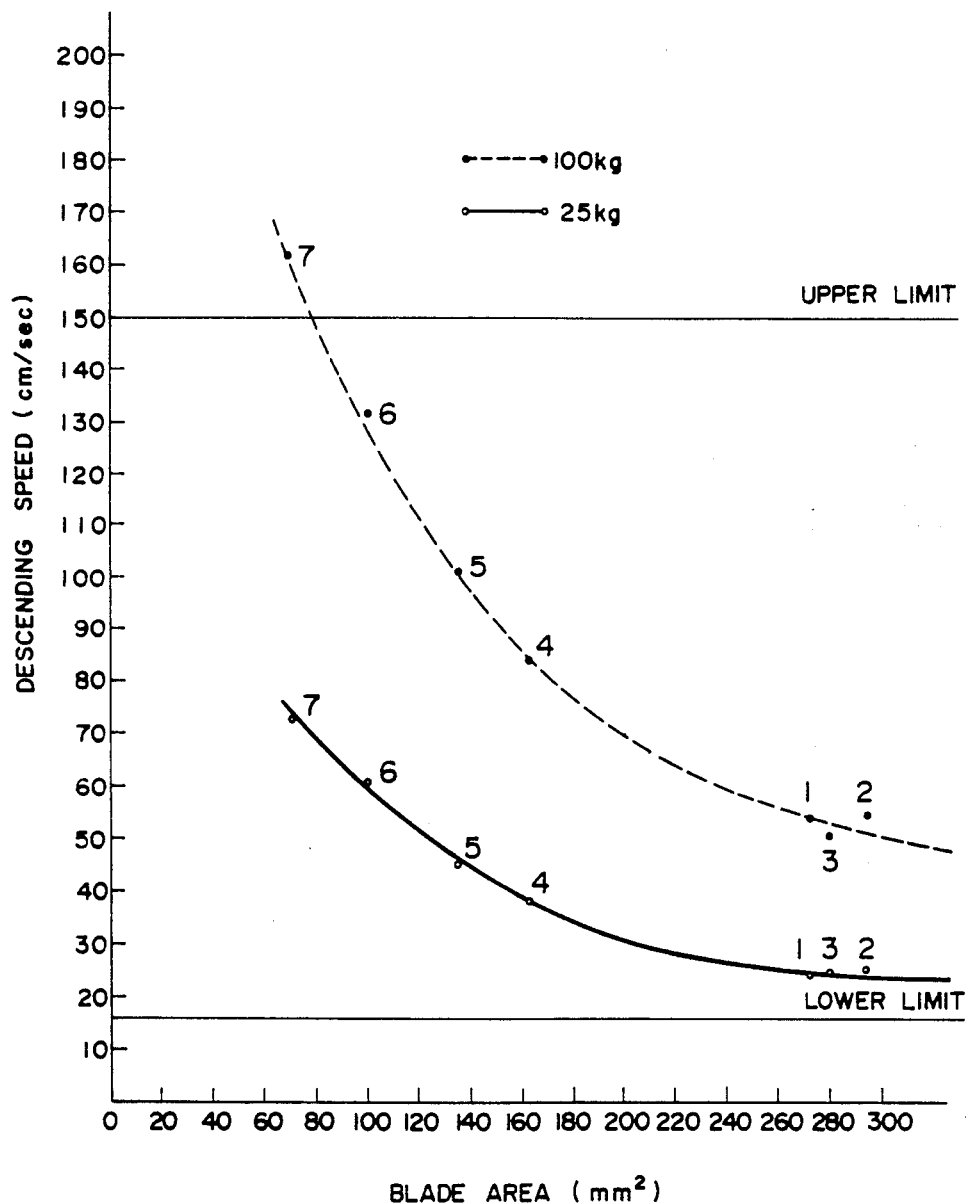
FIG. 8 is a graph illustrating the relationship between the blade area and the descent speed.

Table 5 and FIGS. 7 and 8 illustrate results of experiments performed for four blade impellers having different blade areas. As can be seen from FIG. 7, a descent speed ratio of blade 6, whose blade area is about 100 m², lies on a straight line I, but a descent speed ratio of blade 7, whose blade ratio is less than 100 mm², greatly deviates from straight line I. Straight line II is a theoretical line. As viewed in FIG. 8, concerning the same features, blade 7 exhibits descent speeds higher than the 150 cm/sec. prescribed by the Japanese Autonomy Agency under a load of 100 kg, so that blade 7 cannot be used.

Moreover as seen in FIG. 8, it is expected that the descent speed of blades whose blade area is approximately 300 mm² progressively converge to a constant speed and do not vary even when the blade areas are increased above 300 mm². With impellers of this kind, then, blade areas within 100 to 300 mm² are suitable. These conditions for designing impellers are important factors for determining actual sizes, weights, and shapes of blades. At the same time, the shape of the driving pulley and the braking mechanism of the pendulum pulleys for the suspended lines are also very important when safe descent is crucial.

TABLE 5

| Test | Blade size (mm) *1 | Blade area (mm) *2 | Load (kg) *3 | Descending speed (cm/sec) *4 | | | | |
|---|---|---|---|---|---|---|---|---|
| | | | | 1 | 2 | 3 | 4 | Average |
| 1 | 13.9 × 19.6 | 272.4 (100) | 25 | 23.1 | 25.3 | 23.6 | 25.3 | 24.3 (100) |
| | | | 100 | 55.4 | 52.1 | 55.8 | 52.6 | 54.0 (100) |
| 2 | 15.0 × 19.6 | 294.0 (107.6) | 25 | 24.1 | 26.3 | 23.5 | 26.5 | 25.1 (103.3) |
| | | | 100 | 52.4 | 56.4 | 52.4 | 56.8 | 54.4 (100.9) |
| 3 | 13.8 × 20.3 | 280.1 (102.8) | 25 | 24.7 | 24.8 | 24.2 | 24.8 | 24.6 (101.2) |
| | | | 100 | 48.4 | 51.9 | 48.1 | 51.9 | 50.1 (92.8) |
| 4 | 8.0 × 20.3 | 162.4 (59.6) | 25 | 36.2 | 38.9 | 36.9 | 39.1 | 37.8 (155.6) |
| | | | 100 | 86.7 | 82.4 | 85.7 | 81.5 | 84.1 (155.7) |

TABLE 5-continued

| Test | Blade size (mm) *1 | Blade area (mm) *2 | Load (kg) *3 | Descending speed (cm/sec) *4 | | | | |
|---|---|---|---|---|---|---|---|---|
| | | | | 1 | 2 | 3 | 4 | Average |
| 5 | 6.7 × 20.3 | 136.0 (49.9) | 25 | 43.4 | 46.3 | 44.0 | 47.0 | 45.2 (186.0) |
| | | | 100 | 102.7 | 100.0 | 98.7 | 102.7 | 101.0 (187.0) |
| 6 | 5.0 × 20.3 | 101.5 (37.3) | 25 | 59.8 | 60.5 | 60.5 | 61.0 | 60.5 (249.0) |
| | | | 100 | 130.4 | 132.7 | 129.3 | 132.7 | 131.3 (243.1) |
| 7 | 3.5 × 20.3 | 71.1 (26.1) | 25 | 71.1 | 75.0 | 72.8 | 71.8 | 72.7 (299.2) |
| | | | 100 | 164.8 | 161.3 | 166.7 | 163.0 | 162.7 (301.3) |

Figure 4:
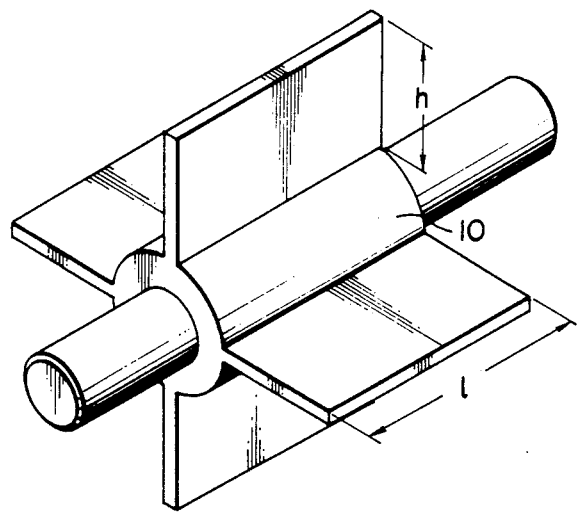
FIG. 4 is a perspective view of an impeller used in the descent slowing device according to the invention.

NOTE:
*1 The blade sizes (height H × length L, for example 15.0 × 19.6) are those in Fig. 4.
*2 The blade area equals 15.0 × 19.6 = 294 mm². Assuming that the area (272.4 mm²) of blade 1 is 100, percentages (%) are indicated in brackets.
*3 The load was iron weight.
*4 Assuming that the descent speed using blade 1 and loads of 25 kg or 100 kg is 100, percentages (%) are indicated in brackets.
Test conditions:
(1) load descent device was Type III in Table 1 (reduction ratio 47.2:1)
(2) Oil used: DOS-TCP-95/5
(3) filled volume: 97.5%
(4) line used: 8.7 mm diameter cotton braided rope
(5) temperature: 15° C.

In the case of Japanese Unexamined Patent Publication (Kokai) No. 55-103,871, the drive pulley fitted on the input drive shaft (referring to FIG. 2 of this publication) has a simple circular groove for receiving a line so that the line fits into a V-shaped groove so as to be pressed against the groove walls to prevent slippage between the line and the pulley. In the event that the line is wet and the atmosphere is cold, or the line is new and rigid (for example at the beginning of use), the collapse of the line by the V-shaped groove is insufficient to grip the line, often resulting in rope slippage.

Figure 5:
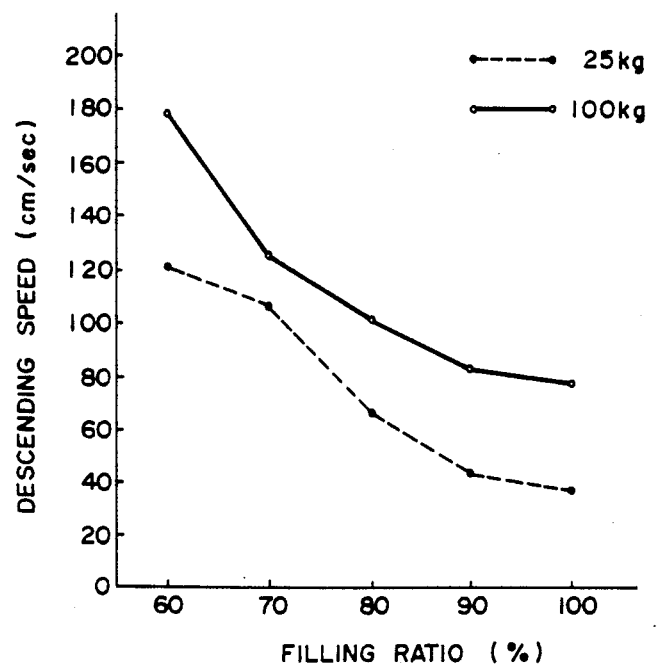
FIG. 5 is a graph illustrating the relationship between the descent speed and filling ratio of rotation control oil in the device.

According to the invention, the V-shaped groove or line receiving groove of drive pulley 14 comprises the abutting projections 15 and recesses 16 as shown in FIG. 5 so that line 26 is urged against the rope receiving groove and is simultaneously gripped strongly by abutting projections 15, thereby avoiding line slippage to ensure smooth descent.

Figure 1:
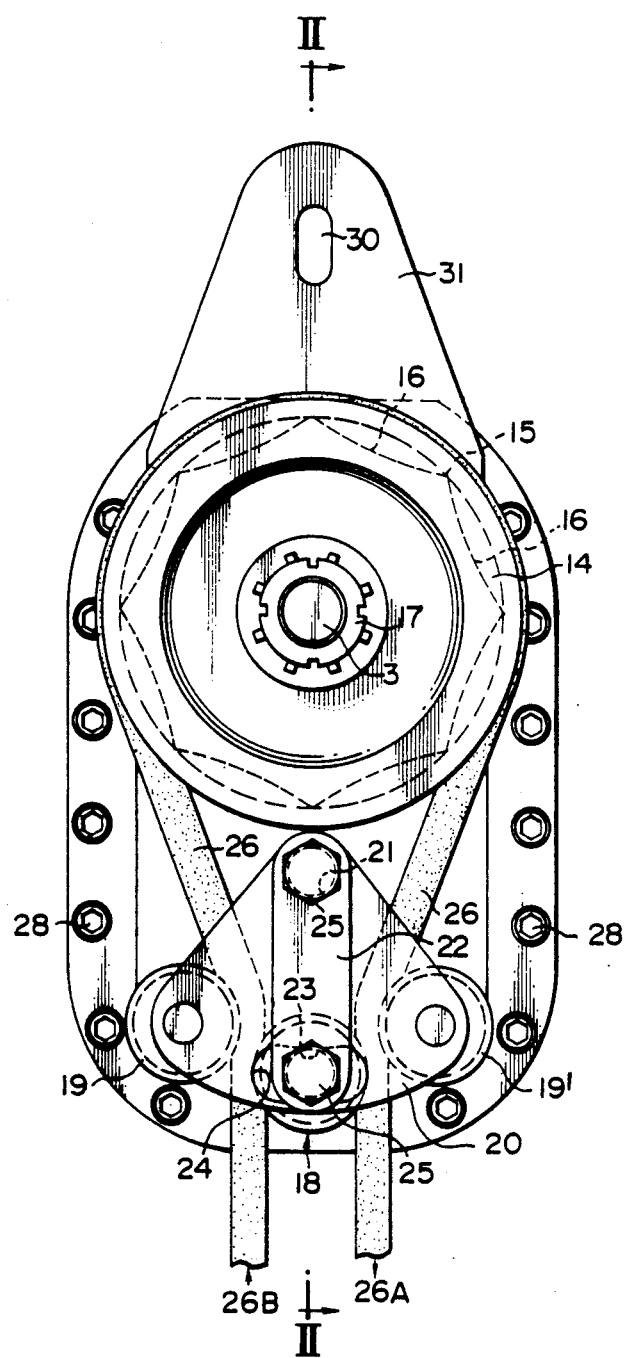
FIG. 1 is a front elevation of one embodiment of an impeller type descent slowing device according to the invention.

Moreover, the halves of line 26 extending around drive pulley 14 pass between pendulum pulleys 19 and 19', respectively, and the stationary pulley 18 used for descent. Referring to FIG. 1, when line 26A on the right side as viewed in the drawing is subjected to a load, it will descend smartly urging pendulum pulley 19' outwardly. Accordingly, pendulum pulley 19 on the opposite side serves to strongly urge ascending line 26B against stationary pulley 18. As a result, the line abuts more firmly against abutting projections 15 of the drive pulley and fits more securely into the V-shaped groove so as to be firmly compressed against the groove walls. Safety and security is imparted by the stable constant descent speed that results from this speed governor function of pendulum pulleys 19 and 19' and stationary pulley 18 acting against the line.

This governor function of pendulum pulleys 19 and 19' and stationary pulley 18 against the rope is caused by the ascent and descent of the rope. As mentioned above, pendulum pulleys 19 and 19' are rotatably mounted at the ends of the base of two triangular pendulum plates 20, and the apexes thereof are pivotally mounted at substantially the midportion of the casing in alignment with the center of input driving shaft 3 and stationary pulley 18 by means of fixing pin 21. The position of fixing pin 21 for pendulum plates 20 is an important factor in the governor function of pendulum pulleys 19 and 19' and stationary pulley 18 provide with the line. The higher the position of pin 21, the weaker is the governor function. On the other hand, the closer the position of pin 21 is to stationary pulley 18, the stronger is the governor function. A position of pin 21 extremely close to stationary pulley 18 or at an extremely low position is not preferable, however, because pin 21 then is subjected to an unstable raising force causing pulley malfunctions due to increased friction. As a compromise between the necessary governor function and prevention of malfunctions, fixing pin 21 is best located substantially at a mid-point on a straight line connecting the input drive shaft and stationary pulley or the center of the drive shaft and the stationary pulley; furthermore, pendulum pulleys 19 and 19' and stationary pulley 18 are arranged on the same circle.

As can be seen from the above description, the descent slowing device constructed as described above according to the invention always operates smoothly and securely even after a long period of unuse because it is sealed and the oil uncontaminated and can operate safely and reliably under various load conditions such as continuous use, at low temperatures such as −20° C. and at high temperatures such as 50° C.

It is further understood by those skilled in the art that the foregoing description is that of preferred embodiments of the disclosed device, and that various changes and modifications may be made in the invention without departing from the spirit and scope thereof.

We claim:

1. An impeller type descent slowing device comprising:
   (a) a closed housing having a predetermined inner volume;
   (b) a plurality of gears positioned within said housing;
   (c) an impeller positioned within said housing;
   (d) a viscous fluid within said housing comprising means for controlling rotation of said impeller, said viscous fluid comprising a rotation control oil having a viscosity from 100 cps to 500 cps at −20° C.;

(e) an input drive shaft positioned within said housing and a drive shaft pulley fitted about said drive shaft;

(f) a line trained about said drive pulley, said impeller comprising four blades, the ratio of the speed of rotation of said impeller with respect to the speed of rotation of said input driving shaft being greater than 40:1 and less than 50:1, said rotation control oil comprising means for restraining rotation of said impeller to obtain a constant speed of descent for a load when said load is applied to said line, said impeller being rotated via said input drive shaft; and (g) a stationary pulley and two pendulum pulleys which are rockable in unison, said line extending between respective ones of said pendulum pulleys and said stationary pulley, each said pendulum pulley and said stationary pulley together comprising means for frictionally compressing said line; and (h) a substantially triangular plate which is pivotably mounted to said housing at a position which is substantially centrally located below said input drive shaft and above said stationary pulley.

2. An impeller type descent slowing device comprising:

(a) a closed housing having a predetermined inner volume;

(b) a plurality of gears positioned within said housing;

(c) an impeller positioned within said housing;

(d) a viscous fluid located within said housing, said fluid comprising means for controlling the rotation of said impeller;

(e) an input drive shaft positioned within said housing, and a drive pulley fitted about said drive shaft;

(f) a line trained about said drive pulley, said impeller comprising four blades, the ratio of the speed of rotation of said impeller with respect to the speed of rotation of said input drive shaft being greater than 40:1 and less than 50:1, said rotation control oil comprising means for restraining rotation of said impeller to maintain a constant speed of descent for a load when said load is applied to said line, said impeller being rotated via said input drive shaft;

(g) a stationary pulley and two pendulum pulleys which are rockable in unison, said line extending between respective ones of said pendulum pulleys and said stationary pulley, each said pendulum pulley and said stationary pulley together comprising means for frictionally compressing said line; and (h) at least one triangular pendulum plate having a base and an apex which is pivotably mounted on said housing, said pendulum plate being pivotably mounted to said housing at a position which is substantially centrally located below said input driving shaft and above said stationary pulley, said pendulum pulleys being mounted on said plate base, each said one triangular plate comprising elongated slots which comprise means for receiving said stationary pulley, for limiting movement of said pendulum plate, and for guiding movement of said pendulum pulleys towards and away from said stationary pulley.

3. An impeller type descent slowing device comprising:

(a) a closed housing having a predetermined inner volume;

(b) a plurality of gears positioned within said housing;

(c) an impeller positioned within said housing;

(d) a viscous fluid located within said housing, said fluid comprising means for controlling the rotation of said impeller;

(e) an input drive shaft positioned within said housing in a drive pulley fitted about said drive shaft;

(f) a line trained about said drive pulley, said impeller comprising four blades, the ratio of the speed of rotation of said impeller with respect to the speed of rotation of said input driving shaft being greater than 40:1 and less than 50:1, said rotation control oil comprising means for restraining rotation of said impeller to obtain a constant speed of descent for a load when said load is applied to said line, said impeller being rotated via said input drive shaft;

(g) a stationary pulley and two pendulum pulleys which are rockable in unison, said line extending between respective ones of said pendulum pulleys and said stationary pulley, each said pendulum pulley and said stationary pulley together comprising means for frictionally compressing said line; and (h) a substantially triangular plate comprising a substantially right-angle triangle which is pivotably mounted to said housing at a position which is substantially centrally located below said input drive shaft and above said stationary pulley.

4. An impeller type descent slowing device in accordance with claim 3, said rotation control fluid occupying between 90% and 96% of the volume defined by said housing and unoccupied by said gears, said impeller and a metal bracket which comprises a support for said drive shaft.

5. An impeller type descent slowing device in accordance with claim 4 said volume being between 94% and 96% of said unoccupied space within said housing.

6. An impeller type descent slowing device in accordance with claim 3, said drive pulley having a plurality of projections that abut and contact said line when said line is positioned on said pulley, and a plurality of non-contact recesses positioned between adjacent projections.

7. An impeller type descent slowing device in accordance with claim 6, said alternately abutting projections and recesses being arranged in the form of a substantially regular polygon, as viewed in cross-section.

8. An impeller type descent slowing device in accordance with claim 3, said pendulum pulleys being rotatably mounted at the ends of bases of triangular plates having apexes that are pivotably mounted on said housing, said triangular plates being formed with elongated slots that are adapted to receive said stationary pulley and limit movement of said pendulum plate and to comprise means for permitting said pendulum pulleys to move toward and away from said stationary pulley.

9. An impeller type descent slowing device in accordance with claim 3, further comprising a pendulum pin for pivotably mounting said pendulum pulley with respect to said stationary pulley, said pendulum pin being positioned substantially at the mid-point between the center of said input drive shaft and said stationary pulley, along an imaginary straight line that would connect said centers.

10. An impeller type descent slowing device in accordance with claim 3, wherein said drive pulley is positioned on an exterior side of said housing.

11. An impeller type descent slowing device in accordance with claim 10, wherein said stationary pulley and said two pendulum pulleys are attached to the exterior of said housing on the same side as said drive pulley.

12. An impeller type descent slowing device in accordance with claim 11, wherein said housing has an upper edge and a lower edge, with said drive pulley being positioned adjacent the upper edge of said housing and said stationary pulley and said pendulum pulleys being positioned adjacent the lower edge of said housing.

13. An impeller type descent slowing device in accordance with claim 12, wherein said pendulum pulleys are positioned to either side, and slightly above, the stationary pulley.

14. An impeller type descent slowing device in accordance with claim 3, wherein said plurality of gears comprises three gears, one said gears being driven by said input driving shaft, the other two of said gears being rotatable in response to rotation of said one gear.

15. An impeller type descent slowing device in accordance with claim 14, wherein said impeller comprises a toothed pinion that is engageable with one of said rotatable gears and driven by another one of said other two gears.

16. An impeller type descent slowing device in accordance with claim 3 wherein said substantially triangular plate comprises a pendulum plate which is mounted to said housing by a pendulum pin comprising means for pivotably mounting said pendulum pulleys to said stationary pulley.

* * * * *

UNITED STATES PATENT AND TRADEMARK OFFICE
CERTIFICATE OF CORRECTION

PATENT NO. : 4,655,327

DATED : April 7, 1987

INVENTOR(S) : Hisatsugu TOMIOKA et al.

It is certified that error appears in the above-identified patent and that said Letters Patent is hereby corrected as shown below:

At column 2, line 7 of the printed patent, change "temperatures" to ---temperature---.

At column 7, line 11 of the printed patent, change "Kg" to ---kg---.

At column 7, line 14 of the printed patent, change "Kg" to ---kg---.

At column 7, line 14 of the printed patent, insert ---of--- after "conditions" and before "25".

At column 9, Table 9, Note 1 of the printed patent, change "Inthis manner" to ---In this manner---.

At column 9, line 28 of the printed patent, change "holds" to ---hold---.

At column 11, line 39 of the printed patent, change "FIG. 5" to ---FIG. 3---.

At column 11, Table 5 of the printed patent, change "NOTE:" to ---NOTES:---.

At column 12, line 28 of the printed patent, change "provide" to ---provided---.

Signed and Sealed this

Thirtieth Day of August, 1988

*Attest:*

DONALD J. QUIGG

*Attesting Officer*     *Commissioner of Patents and Trademarks*